US012640053B2

(12) United States Patent
Yang et al.

(10) Patent No.: US 12,640,053 B2
(45) Date of Patent: May 26, 2026

(54) GYN PATHOLOGY SURGICAL SIMULATION MODELS AND SYSTEMS FOR SURGICAL TRAINING

(71) Applicant: Applied Medical Resources Corporation, Rancho Santa Margarita, CA (US)

(72) Inventors: Shih Chieh Yang, Rancho Santa Margarita, CA (US); Tulsi Patel, Rancho Santa Margarita, CA (US); Emma Stumpf, Rancho Santa Margarita, CA (US); Oscar Raygan, Rancho Santa Margarita, CA (US); Gregory K. Hofstetter, Rancho Santa Margarita, CA (US)

(73) Assignee: Applied Medical Resources Corporation, Rancho Santa Margarita, CA (US)

( * ) Notice: Subject to any disclaimer, the term of this patent is extended or adjusted under 35 U.S.C. 154(b) by 969 days.

(21) Appl. No.: 17/878,704

(22) Filed: Aug. 1, 2022

(65) Prior Publication Data

US 2023/0035446 A1     Feb. 2, 2023

Related U.S. Application Data

(60) Provisional application No. 63/227,502, filed on Jul. 30, 2021, provisional application No. 63/227,530, filed on Jul. 30, 2021.

(51) Int. Cl.
    *G09B 23/30*          (2006.01)
    *G09B 23/28*          (2006.01)
(52) U.S. Cl.
    CPC ......... *G09B 23/281* (2013.01); *G09B 23/303* (2013.01)

(58) Field of Classification Search
    CPC ................................ G09B 23/28; G09B 23/30
    See application file for complete search history.

(56) References Cited

U.S. PATENT DOCUMENTS 8,764,452 B2    7/2014  Pravong et al.
9,123,261 B2 *  9/2015  Lowe ................... G09B 23/281
                        (Continued)

FOREIGN PATENT DOCUMENTS

WO      WO 2016/134269 A1      8/2016

OTHER PUBLICATIONS

3B Scientific, "Ectopic Pregnancy Set," https://www.a3bs.com/ectopic-pregnancy-set-1021656-xp91p92-006-3b-scientific,p_171_30410.html, 1pg.

(Continued)

*Primary Examiner* — Kurt Fernstrom
(74) *Attorney, Agent, or Firm* — Shirin Bozorgui; Patrick Ikehara

(57)          ABSTRACT

Embodiments of the present invention provide GYN pathology simulation models for surgical training. These models are energy-compatible models emulating the tissue-based diseases of the female reproductive system to allow the surgical trainees and surgeons to practice advanced OB/GYN surgical skills. One simulated GYN model includes an electrically conductive elongated tube encapsulating a mass of non-conductive material. The elongated tube having a sidewall with an inner surface and outer surface extending between a proximal end and distal end. The sidewall is configured to have a cavity with a specific volume to yield an external protuberance when filled with the mass of non-conductive material. Another simulated GYN model includes a fluid-filled cystic body encapsulated within an electrically conductive bulbous hollow structure. The fluid-filled cystic body is selectively adhered to the (Continued)

bulbous hollow structure in at least one or more regions, thereby creating a plane for a combination of blunt and sharp dissection.

20 Claims, 7 Drawing Sheets

(56) References Cited

U.S. PATENT DOCUMENTS

| | | | | |
|---|---|---|---|---|
| 11,373,554 | B2 * | 6/2022 | Myers | G09B 23/34 |
| 2011/0207103 | A1 * | 8/2011 | Trotta | B29C 39/025 |
| | | | | 264/255 |
| 2012/0276511 | A1 * | 11/2012 | Parry | G09B 23/30 |
| | | | | 434/270 |
| 2014/0248596 | A1 * | 9/2014 | Hart | G09B 23/285 |
| | | | | 434/262 |
| 2015/0086955 | A1 * | 3/2015 | Poniatowski | G06T 7/0014 |
| | | | | 434/262 |
| 2016/0098943 | A1 * | 4/2016 | Valeev | G09B 23/285 |
| | | | | 434/267 |
| 2016/0293055 | A1 * | 10/2016 | Hofstetter | G09B 23/281 |
| 2017/0116888 | A1 * | 4/2017 | Bellezzo | G09B 23/34 |

OTHER PUBLICATIONS

Baily, "VirtaMed Launches Ectopic Pregnancy Clinical Simulation Video Series," Jan. 25, 2021, https://www.healthysimulation.com/30149/virtamed-video-series/.
Celiz, et al. "Supplementary Materials for Tough Adhesives for Diverse Wet Surfaces," https://science.sciencemag.org/content/357/6349/378, Jul. 28, 2017, Science 357, 378, 36 pgs.
Ectopic Pregnancy Model (3D Med), https:www.3-dmed.com/product/ectopic-pregnancy-model, 1 pg.
European Patent Office, The International Search Report and Written Opinion of the International Searching Authority for International Application No. PCT/US2022/039063 titled "Gyn Pathology Surgical Simulation Models and Systems for Surgical Training", mailed Nov. 2, 2022, 17 pgs.
Inovus Medical, "Simulated Laparoscopic Removal of an Ectopic Pregnancy," Aug. 15, 2018, https://www.youtube.com/watch?v-6YFshe2q2KQ.
Koken, Co., LTD, "Gynecological Examination Simulator LM-110," https://www.kokenmpc.co.jp/english/products/life_simulation models/medical_education/lm-110/index/html, 1 pg.
Li, et al., "Tough Adhesives for Diverse Wet Surfaces," Science 357, Jul. 28, 2017, 378-381, 5 pgs.
Mati-Baouche, et al. "Chitosan as an Adhesive," https://science.sciencemag.org/content/357/6349/378, *European Polymer Journal*, 60, 2014, pp. 198-212.
Medimodels, "Ectopic Pregnancy Model," https://medimodels.com/products/ectopic-pregnancy, 4 pgs.
Muacevic, et al., "Development of a Sustainable Simulator and Simulation Program for Laparoscopic Skills Training in Haiti," *Development of a Sustainable Simulator and Simulation Program for Laparoscopic Skills Training in Haiti—PMC* (nih.gov), Cureus, Jun. 5, 2016; vol. (8)6.
Muacevic, et al., "Simulation-based Training in Ectopic Pregnancy and Salpingostomy. Compatible with Electrosurgical Devices; Using Animal Flesh," https://www.ncbi.nlm.nih.gov/pmc/articles/PMC6741363/, Cureus, Jul. 2019; 11(7):e5116, 11 pgs.
Surgical Science, "LapSim Gynecology: Ectopic Pregnancy," Oct. 18, 2017, https://www.youtube.com/watch?v=D-PwhnH4ipc.
Varras, et al., "Comparison of Laparoscopic Surgical Skills Acquired on a Virtual Reality Simulator and a Box Trainer: An Analysis for Obstetrics-Gynecology Residents," https://www.researchgate.net/publication/345992723_Comparison_of_laparoscopic_surgical_skills_acquired_on_a_virtual_reality_simulator_and_a_box_trainer_an_analysis_for_obstetrics-gynecology_residents, CEOG Clinical and Experimental Obstetrics & Gynecology, ISSN: 0390-6663, XL VII, n. 5, 2020, pp. 755-763.
The International Bureau of WIPO, International Preliminary Report on Patentability for International Application No. PCT/US2022/039063, entitled GYN Pathology Surgical Simulation Models and Systems for Surgical Training, dated Feb. 8, 2024, 10 pgs.

* cited by examiner

*100*

*140-1*

*160*

*140*

*100*

*160*

*120*

1

GYN PATHOLOGY SURGICAL SIMULATION MODELS AND SYSTEMS FOR SURGICAL TRAINING

CROSS-REFERENCE TO RELATED APPLICATIONS

This application claims priority to and benefit of U.S. Provisional Patent Application Ser. No. 63/227,502 entitled "Ectopic Pregnancy Model" filed on Jul. 30, 2021 and U.S. Provisional Patent Application Ser. No. 63/227,530 entitled "Ovarian Cyst Torsion Model" filed on Jul. 30, 2021, which are hereby expressly incorporated by reference in their entireties for all purposes.

TECHNICAL FIELD

The present invention generally relates to surgical training tools, and in particular, to gynecology (GYN) pathology surgical simulation models and systems for teaching and practicing various surgical techniques and procedures related but not limited to laparoscopic, endoscopic and minimally invasive surgery.

BACKGROUND

Both ectopic pregnancy and ovarian torsion represent surgical emergencies. Ectopic or extrauterine pregnancy, is a pregnancy that occurs when a fertilized egg implants and grows outside the main cavity of the uterus. In more than 90% of cases, the egg implants in a fallopian tube, also called a tubal ectopic pregnancy. In the remaining cases, it is implanted in cervix, ovaries, abdomen or the uterine muscle. Ectopic pregnancy remains the leading cause of death in the first trimester and accounts for approximately 3 to 4 percent of all pregnancy-related deaths. In the treatment of tubal ectopic pregnancy, laparoscopic surgery remains the cornerstone of treatment. The surgical approach for ectopic pregnancies evolves from radical (salpingectomy) to conservative (salpingostomy) procedures. Salpingectomy is the surgical removal of one or both fallopian tubes. On the other hand, salpingostomy is a procedure in which the contents of the fallopian tubes are removed by making an incision into the tube over the site of the pregnancy. This procedure is considered as the surgical procedure of choice when unruptured tubal pregnancy is found in women and is performed with the goal of preserving the tube for future conceptions.

On the other hand, ovarian torsion, also called adnexal torsion, refers to the complete or partial rotation of the adnexal supporting organ that often results in partial or complete obstruction of the blood supply to the ovary. This condition mainly occurs when the ovary and sometimes the fallopian tube twist on the ligament-like tissues that support and hold these organs in place. Ovarian torsion can affect women of all ages, including premenarchal and post-menopausal females. In more than 80% of cases, ovarian torsion occurs due to an ovarian cyst or mass of over 5 cm in diameter. Of the above, about 20% of ovarian torsion occurs in pregnant women. Torsion of non-cystic ovaries occurs most frequently in young children when developmental abnormalities predispose the ovary to torsion. Early diagnosis of ovarian torsion is necessary to preserve the function of the ovaries and to prevent other associated morbidity.

Similar to ectopic pregnancy, the mainstay of the treatment for ovarian torsion is surgery. This is also the only way to confirm the torsion. A minimally invasive surgical approach is recommended with detorsion and preservation of the adnexal structures regardless of the appearance of the ovary. The majority of benign ovarian cystectomies and detorsion can be performed laparoscopically. Prior to laparoscopic surgery, basic investigations must be completed for evaluating risk of ovarian malignancy. Conservative procedure with detorsion and ovarian cystectomy is considered as the treatment of choice. However, radical procedure such as surgical removal of the ovary (oophorectomy) or both the ovary and its fallopian tube (salpingo-oophorectomy), can be the treatment of the choice if necrosis of the tissues has taken place.

Ovarian torsion is a rare but surgical emergency condition that requires prompt diagnosis and laparoscopic intervention to ensure preservation of ovarian function. However, this condition may be rarely encountered during medical training. On the other hand, notwithstanding the worldwide rise in ectopic pregnancies, they are also rarely encountered during medical training. More specifically, there is an apparent growing concern amongst OB/GYN trainees regarding the inadequacy of exposure to minimally invasive gynecologic surgical training. Additionally, there is an increasingly common concern about the adequacy of surgical training, and in particular laparoscopic surgical training, during the traditional 4-year OB/GYN residency. This creates a problem for trainees who need realistic, accessible training prior to entering the operation room. Additionally, there are few options for high fidelity, energy-compatible simulation models that allow surgical trainees to practice laparoscopic removal of an ectopic mass and/or detorsion and removal of an ovarian cyst. The organs in the model should not only be simulated to closely resemble a living body but also to be able to be moved and maneuvered as they would be in the body. Moreover, the organs on the model should be attached to the model so that they can be moved and positioned into optimal surgical positions.

Furthermore, many surgical procedures involve the use of energy-based surgical instruments such as, for example, electrosurgical graspers, scissors, tweezers, blades, probes or dissectors. These instruments provide the surgeon with the convenience of nearly effortless cutting and dissection of tissue with nearly instant thermal hemostasis limiting blood loss. Such instruments have become a standard within the surgical community and are used regularly in a variety of procedures. Therefore, there is a need for organ models or simulated tissue elements or training modules that include the ability to train in the use of energy-based surgical or electrosurgical instruments. It would therefore seem apparent that realistic organ models for use with simulated pelvic trainers on which surgeons can train surgical techniques are needed.

SUMMARY

In accordance with various embodiments, GYN (gynecology) pathology surgical simulation models or systems for surgical training are provided. These models or systems are energy-compatible models that simulate the tissue-based diseases of the female reproductive system to allow the surgical trainees and surgeons to practice advanced OB/GYN surgical skills, e.g., salpingostomy, ovarian cystectomy, ovarian cystectomy and detorsion, as well as other basic OB/GYN surgical skills, e.g., suturing. Using a monopolar electrosurgical instrument in various embodiments RF energy is supplied to the simulated surgical site to incise the simulated target tissue and remove and/or dissect the simulated abnormalities.

In accordance with one aspect of the present invention, a gynecology pathology surgical simulation system is provided. The GYN pathology surgical simulation system may include a tubular structure defining a central lumen extending along a longitudinal axis between a proximal end and a distal end and a viscous material encapsulated inside a cavity formed along at least a portion of the central lumen so as to yield an external protuberance when filled with the viscous material. The viscous material according to the embodiments of the present invention may include a non-water soluble material and non-conductive material. In various embodiments, the viscous material is non-uniform and made from a fibrous material or from a liquid and fibrous mixture.

In accordance with a second aspect of the present invention, a method for manufacturing a gynecology pathology surgical simulation system is provided. The method includes the steps of: providing a mandrel and suspending the mandrel inside a two-part mold cavity; applying a layer of electrically conductive material onto the mandrel and curing the layer of electrically conductive material to create a thin-walled tubular structure defining a central lumen; providing a viscous material and encapsulating the viscous material inside a cavity formed along a portion of the thin-walled tubular structure.

In accordance with a third aspect of the present invention, a gynecology pathology surgical simulation system is provided. The gynecology pathology surgical simulation system may include a simulated fallopian tube having a sidewall with an inner surface and an outer surface extending between a proximal end and a distal end and defining a central lumen along a longitudinal axis. The sidewall of the simulated fallopian tube according to the embodiments of the present invention is configured to encapsulate a simulated ectopic mass or embryo at a location along the longitudinal axis such that the location of the simulated ectopic mass or embryo is identifiable from the outside of the simulated fallopian tube. The simulated ectopic mass or embryo in various embodiments is made of a non-water based and non-conductive material while the simulated fallopian tube is made of electrically conductive material. In various embodiments, the simulated ectopic mass or embryo is made of a single-part platinum-cured silicone thermoset and batting mixture in a ratio of 9 grams to 2 cm×2 cm.

In accordance with a fourth aspect of the present invention, a surgical simulation system is provided. The surgical simulation system may include an ectopic pregnancy model and a surgical training device configured to mimic a torso. The ectopic pregnancy model in accordance with various embodiments may include a simulated fallopian tube having a tubular structure defining a central lumen extending along a longitudinal axis between a proximal end and a distal end; the tubular structure being made of electrically conductive material and a viscous material encapsulated inside a cavity formed along at least a portion of the central lumen so as to yield an external protuberance when filled with the viscous material. The surgical training device according to the embodiments of the present invention may include a base and a top cover connected to and spaced apart from the base to define an internal cavity between the top cover and the base. The internal cavity of the surgical training device is partially obstructed from direct observation by a user while the top cover includes an aperture or penetrable simulated tissue region to access the internal cavity. The ectopic pregnancy model in various embodiments is configured for placement on a grounding pad received inside a GYN pathology tray that is configured to be insertable inside the internal cavity of the surgical training device.

In accordance with various embodiments, a gynecology pathology surgical simulation system is provided. The gynecology pathology surgical simulation system may include an elongate tube with a central lumen extending along a longitudinal axis between a proximal end and a distal end and an encapsulated curved body attached to the elongate tube and extending in a direction transverse relative to the longitudinal axis, the encapsulated curved body being larger than the elongate tube. In various embodiments, the elongate tube is or represents a simulated fallopian tube and/or one or more portions of a simulated ovarian-cyst capsule. In various embodiments, the encapsulated curved body is or represents a simulated uterus. In various embodiments, only a portion of the encapsulated curved body is made of electrically conductive material. In various embodiments, a portion of the elongate tube is elevated relative to the encapsulated curved body. The gynecology pathology surgical simulation system further includes a conductive pad that is removably attached to the encapsulated curved body. The conductive pad in various embodiments is electrically/conductively attached to only that portion of the encapsulated curved body that is made of electrically conductive material.

In accordance with one other aspect of the present invention, a gynecology pathology surgical simulation system is provided. The gynecology pathology surgical simulation system may include a fluid-filled cystic body encapsulated within a bulbous hollow structure having a proximal elongation at a proximal end and a distal elongation at a distal end. The fluid-filled cystic body, in various embodiments, is selectively adhered to the bulbous hollow structure in at least one or more regions of an interface between the fluid-filled cystic body and the bulbous hollow structure, thereby creating a plane for a combination of blunt and sharp dissection.

In accordance with another aspect of the present invention, a gynecology pathology surgical simulation system is provided. The gynecology pathology surgical simulation system may include a tubular structure defining a central lumen extending along a longitudinal axis between a proximal end and a distal end, a bulbous hollow structure encapsulating a fluid-filled cystic body, and/or an extremely-thin sheet cut into a desired pattern and/or while having a thickness of less than or equal to 1 mm. The bulbous hollow structure further includes a proximal elongation at a proximal end and a distal elongation at a distal end. The extremely-thin sheet and the tubular structure in various embodiments are accessory organs arranged to facilitate torsion and detorsion of the bulbous hollow structure around at least one of the proximal elongation and distal elongation.

In accordance with yet another aspect of the present invention, a method for manufacturing a gynecology pathology surgical simulation system is provided. The method includes the steps of: providing a fluid-filled cystic body; coating the fluid-filled cystic body with a thickening agent; providing a two-part mold cavity having a shape that conforms to the shape of fluid-filled cystic body with a proximal elongation at a proximal end and a distal elongation at a distal end; the proximal elongation being shorter than distal elongation; encapsulating the fluid-filled cystic body coated with the thickening agent within electrically conductive material.

In accordance with yet another aspect of the present invention, a gynecology pathology surgical simulation system is provided. The gynecology pathology surgical simulation system may include a simulated ovarian-cyst capsule having a bulbous structure with a proximal elongation at a proximal end and a distal elongation at a distal end and a simulated fallopian tube defining a central lumen extending along a longitudinal axis between a proximal end and a distal end. The simulated ovarian-cyst capsule and the simulated fallopian tube are attached to a simulated mesosalpinx sheet using flexible adhesive technique to allow for torsion and detorsion of the ovarian-cyst capsule with or without the simulated fallopian tube.

In accordance with yet another aspect of the present invention, a surgical simulation system is provided. The surgical simulation system may include an ovarian-cyst torsion model and a surgical training device configured to mimic a torso. The ovarian-cyst torsion model in accordance with various embodiments may include a simulated ovarian-cyst capsule having a bulbous structure with a proximal elongation at a proximal end and a distal elongation at a distal end, a simulated fallopian tube having a sidewall with an inner surface and an outer surface extending between a proximal end and a distal end and defining a central lumen along a longitudinal axis, and a simulated mesosalpinx sheet cut into a desired pattern to connect with the simulated ovarian-cyst capsule and the simulated fallopian tube. The surgical training device according to the embodiments of the present invention may include a base and a top cover connected to and spaced apart from the base to define an internal cavity between the top cover and the base. The internal cavity of the surgical training device is partially obstructed from direct observation by a user while the top cover includes an aperture or penetrable simulated tissue region to access the internal cavity. The ovarian-cyst torsion model in various embodiments is configured for placement on a grounding pad received inside a GYN pathology tray that is configured to be insertable inside the internal cavity of the surgical training device.

Many of the attendant features of the present invention will be more readily appreciated as the same becomes better understood by reference to the foregoing and following description and considered in connection with the accompanying drawings.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the first same reference label irrespective of the second reference label.

DETAILED DESCRIPTION

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment of the disclosure. It should be understood that various changes may be made in the function and arrangement of elements without departing from the spirit and scope of the invention as set forth in the appended claims.

This disclosure relates in general to simulated tissue structures and organ models. It specifically relates to gynecology (GYN) pathology surgical simulation models and systems, e.g., ectopic pregnancy model and ovarian cyst torsion model, to assist surgical trainees and surgeons acquiring sufficient surgical skills prior to entering the operation room.

For this purpose, an ectopic pregnancy model for laparoscopic procedures according to the embodiments of the present invention is provided. This model is an energy-compatible model that simulates an ectopic pregnancy and allows surgical trainees to practice the corresponding surgical procedures. In order to simulate the anatomy involved in this procedure, the simulated ectopic mass emulates the fragility of a blood clot to realistically simulate a semi-solid mass that may break apart when experiencing excessive force. In addition, the simulated fallopian tube encapsulates the simulated ectopic mass while also being compatible with electrosurgical devices. Other accessory organs such as, for example, a simulated uterus is also provided with this model. The ectopic pregnancy model, according to the embodiments of the present invention, allows surgical trainees to train on bimanual dexterity, tissue handling, use of electrosurgical instrumentation, and/or camera orientation.

Figure 1:
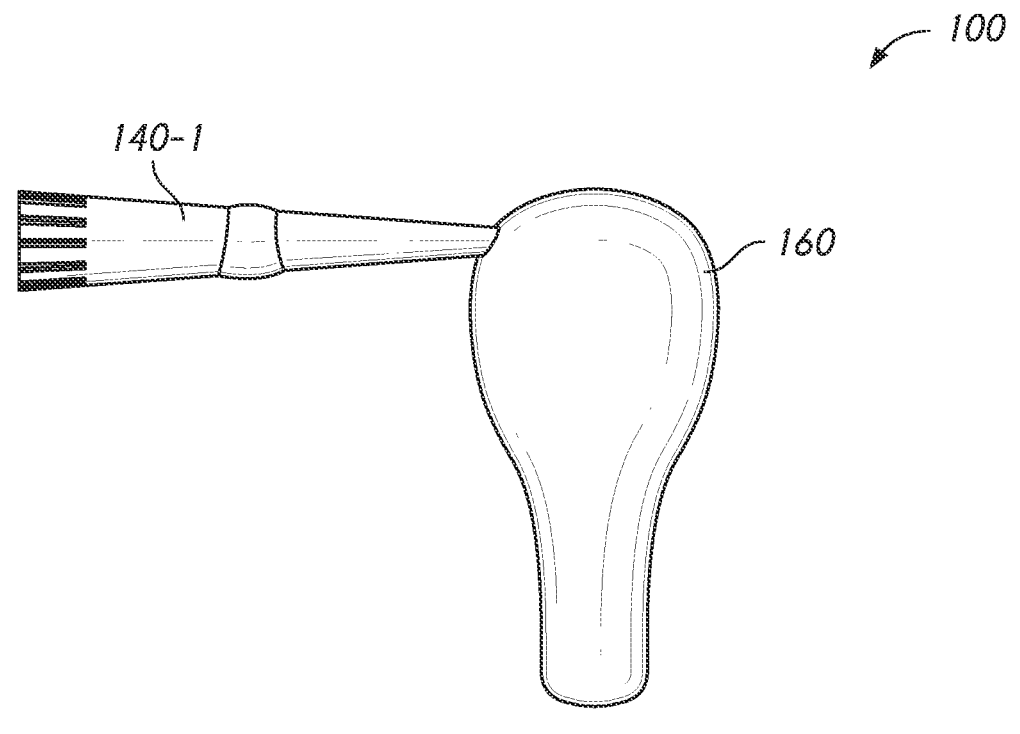
FIG. 1 illustrates a top view of an ectopic pregnancy model according to the embodiments of the present invention.
Figure 2:
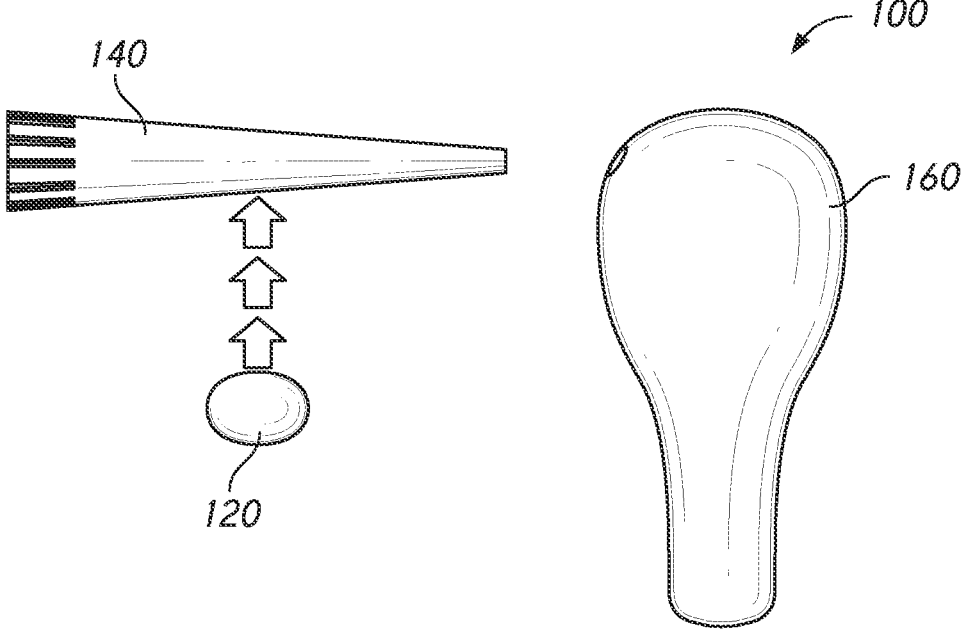
FIG. 2 illustrates an exploded, top view of an ectopic pregnancy model according to the embodiments of the present invention.

Referring first to FIGS. 1-2, an embodiment of an ectopic pregnancy model 100 is shown. In that regard, FIG. 1 is a top view while FIG. 2 is an exploded, top view of the ectopic pregnancy model 100. As shown in these figures, the ectopic pregnancy model 100 may include a simulated ectopic mass or embryo 120. According to the embodiments of the present invention, the simulated ectopic mass or embryo 120 is viscous and not water-based. In various embodiments, the simulated ectopic mass or embryo 120 is made of a non-water based and non-conductive material. In some embodiments, the simulated ectopic mass or embryo 120 comprises a fibrous material and/or uncured silicone. In accordance with various embodiments, the simulated ectopic mass or embryo 120 of the present invention is formed from a single-part platinum-cured silicone thermoset and batting mixture. It should be noted that this mixture does not contain any water based or water soluble material, thereby solving the problem of its absorbency by the surrounding conductive tissue. To emulate the fragility and consistency of a human embryo, 9 grams of one part SORTA-Clear™ silicone part A or part B is used with a 2 cm×2 cm batting. This ratio is proven to be efficient in replicating an embryonic-like consistency. Other one part platinum-cured silicone thermoset, e.g., Ecoflex®, Dragon Skin®, may also be used to achieve similar properties.

In order to closely emulate the natural colors of the human embryo, colorants may also be added to the above mixture. In some embodiments, food colorings, e.g., red food coloring (310 uL) and blue food coloring (15.5 uL), are added to the mixture of one part platinum-cured silicone thermoset and 2 cm×2 cm batting to maximize the realism and anatomical accuracy. In other embodiments, acrylic ink may be added to the mixture to mimic realistic appearance. In select embodiments, dry mineral pigments, e.g., non-water based colorant, are used as the colorant of choice in the mixture of one part platinum-cured silicone thermoset and 2 cm×2 cm batting. This allows to avoid potential color leaching across the fallopian tube, and thus increasing the shelf life of the product. By way of example and not limitation, the dry mineral pigments for a red colorant may include 1,2-dihydroxyantraquinone, e.g., Alzarin Red Lake, organic synthetic, quinacridone, e.g., Primary Red, and carbon and calcium phosphate, e.g., Ivory Black. For a brown colorant, an iron oxide (Fe2O3) which may also contain manganese silicates or dioxides, depending on the selected shade of brown, may also be used as the colorant of choice.

In various embodiments, the batting may be formed from any suitable fibrous materials. Examples of such materials may include cotton fibers (e.g., wool) and gluten fibers (e.g., seitan). In some embodiments, the batting may be formed from felt fabrics that are made of natural fibers. In other embodiments, the batting may be formed form natural sponges that are made of plant fiber sponge and/or animal fiber sponge. In select embodiments, the batting may be formed from foam.

In accordance with various embodiments, the simulated ectopic mass or embryo 120 may be made of mineral oil gel compositions and batting. By way of example and not limitation, such compositions may include HYNAP® HT100 and KRATON® G1651 with a diluted ratio of (12-13:1). In some embodiments, high purity silicone gels such as Nusil® silicone based gels may also be used with the batting. In select embodiments, the batting may be used with a mixture of sodium polyacrylate and gelatin or a mixture of sodium polyacrylate, glue and borax. In one embodiment, petroleum jelly, e.g., Vaseline® jelly, with the batting suspension may be used. In another embodiment, a mixture of soft wax and oil combination may be used with the batting. In yet another embodiment, ballistics gelatin with dilatant fluid, if needed, may be used with the batting. In other embodiments, any suitable electrically conductive materials may also be used with the batting. Other suitable products, compositions and/or solutions may also be used with the batting. Examples of such products may include coagulated blood products, costume "blood" products, and food products.

As discussed further above and also shown FIGS. 1-2, the ectopic pregnancy model 100 according to the embodiments of the present invention may further include a simulated fallopian tube 140. This organ model encapsulates the simulated ectopic mass or embryo 120 while being incisable using electrosurgical instruments. In addition, the embryo's location should be identifiable from outside of this organ model to assist users in identifying items of interest, e.g., location of the simulated ectopic mass or embryo 120. In various embodiments, the simulated fallopian tube 140 of the present invention is a hollow structure made of electrically conductive material or conductive tissue. As can be more clearly seen from FIG. 2, the simulated fallopian tube 140 may include a tubular structure defining a central lumen extending along a longitudinal axis between a proximal end and a distal end. The central lumen is progressively increasing from the proximal end toward the distal end so as to form a sidewall of truncated cone shape with an outer surface and an inner surface extending between the proximal end and the distal end. In some embodiments, the proximal end of the sidewall may be closed.

In accordance with various embodiments, a thin-walled structure is formed by suspending a mandrel inside of a two-part mold cavity. The thin-walled structure may have a thickness of less than or equal to 2 mm. The mandrel according to the embodiments of the present invention has the shape of actual fallopian tubes to create a realistic appearance and cavity size. In order to determine the volume of space needed for embryo, alteration is being made to the mandrel at a location along its longitudinal axis. More specifically, a portion of the mandrel is being altered so as to have a larger diameter relative to the remainder of the mandrel along the longitudinal axis. This larger diameter creates a space or cavity which allows for placement of the simulated ectopic mass or embryo 120. As such and in accordance with various embodiments, the simulated fallopian tube 140 is molded so as to have a cavity with a specific volume to yield a realistic external protuberance or bulge when the simulated ectopic mass 120 is inserted within the cavity (shown in FIG. 3). This external protuberance or bulge assists in identifying the location of ectopic pregnancy, thereby making this feature helpful to the function of the model 100.

After determining the fallopian tube cavity size and volume of embryo ratio and in accordance with various embodiments, the simulated ectopic mass or embryo 120 is encapsulated or otherwise placed inside the cavity of the simulated fallopian tube. In one embodiment, a syringe may be used to inject the simulated ectopic mass or embryo 120 inside the cavity of the simulated fallopian tube for encapsulation. For this purpose, the syringe will be first filled with the simulated embryo's material and be then injected, through the distal end of the simulated fallopian tube 140, into the space made for embryo within the cavity of the simulated fallopian tube. To complete the encapsulation process, the filling and injecting phases may be repeated several times. Care should be taken to allow for release of any air during the encapsulation process. Once the simulated embryo's material is fully injected into the designated space inside the cavity of the simulated fallopian tube, the simulated ectopic mass or embryo 120 will be enclosed inside the simulated fallopian tube 140 using, for example, conductive tissue caps (not shown in the figures). In some embodiments, the conductive tissue caps are bonded into place using adhesive such as Loctite® adhesive.

In various embodiments, the electrically conductive material of the simulated fallopian tube 140 may be made from double-network hydrogels (DN gels). The ionic composition of this type of hydrogels creates a realistic reaction to electrosurgical devices, allowing electrosurgical devices, such as monopolar/bipolar surgical instruments, to be used with this model. Using an electrosurgical device, such as a monopolar/bipolar surgical instrument, an incision may be made into the thin-wall of the fallopian tube to access the simulated ectopic mass or embryo 120 for removal. In some embodiments, hydrogel fibers may be used for forming the simulated fallopian tube 140. Examples of these hydrogel fibers may include saline or vinegar solutions soaked into fibrous structure and Surgilube® lubricant applied to surface of fibrous structure. In other embodiments, textile fabrics coated with conductive solution may be used for forming the simulated fallopian tube 140.

With further reference to FIGS. 1-2, the ectopic model 100 may further include a simulated uterus 160. The simulated uterus 160 according to the embodiments of the present invention acts as an attachment point for the simulated fallopian tube 140 while also providing an increased surface area for electrical grounding purposes. This configuration provides an anchoring point that allows the surgical trainees and surgeons the ability to interact with the simulated fallopian tube 140, while simultaneously training on bimanual dexterity and tissue handling. In various embodiments, the simulated uterus 160 may have a solid, monolithic, or hollow structure. In various embodiments, the simulated uterus 160 is a solid structure or portions thereof made of electrically conductive material or conductive tissue. The conductive material for forming the simulated uterus 160 may include an electro-conductive hydrogel formulation. In one embodiment, the simulated uterus 160 is made of metal puck. In another embodiment, the simulated uterus 160 is formed from natural or synthetic sponges that are saturated in electrolyte solution.

In various embodiments, the simulated uterus 160 is molded as a half uterus, e.g., having half of the uterus or various portions/amounts thereof arranged to be proximate to a grounding pad being made of electrically conductive material, to increase the surface area for electrical grounding purposes and to reduce the overall cost associated with manufacturing. Attaching the simulated fallopian tube 140 to the simulated uterus 160 by conventional techniques such as, for example, using an adhesive may result in inconsistent current flow. To ensure that a continuous electrical pathway is formed between the simulated organs, the simulated fallopian tube 140 according to the embodiments of the present invention is over-molded into the simulated uterus 160. Means for grounding the ectopic pregnancy model 100 or any other GYN pathology simulation models will be described in greater detail below.

Figure 3:
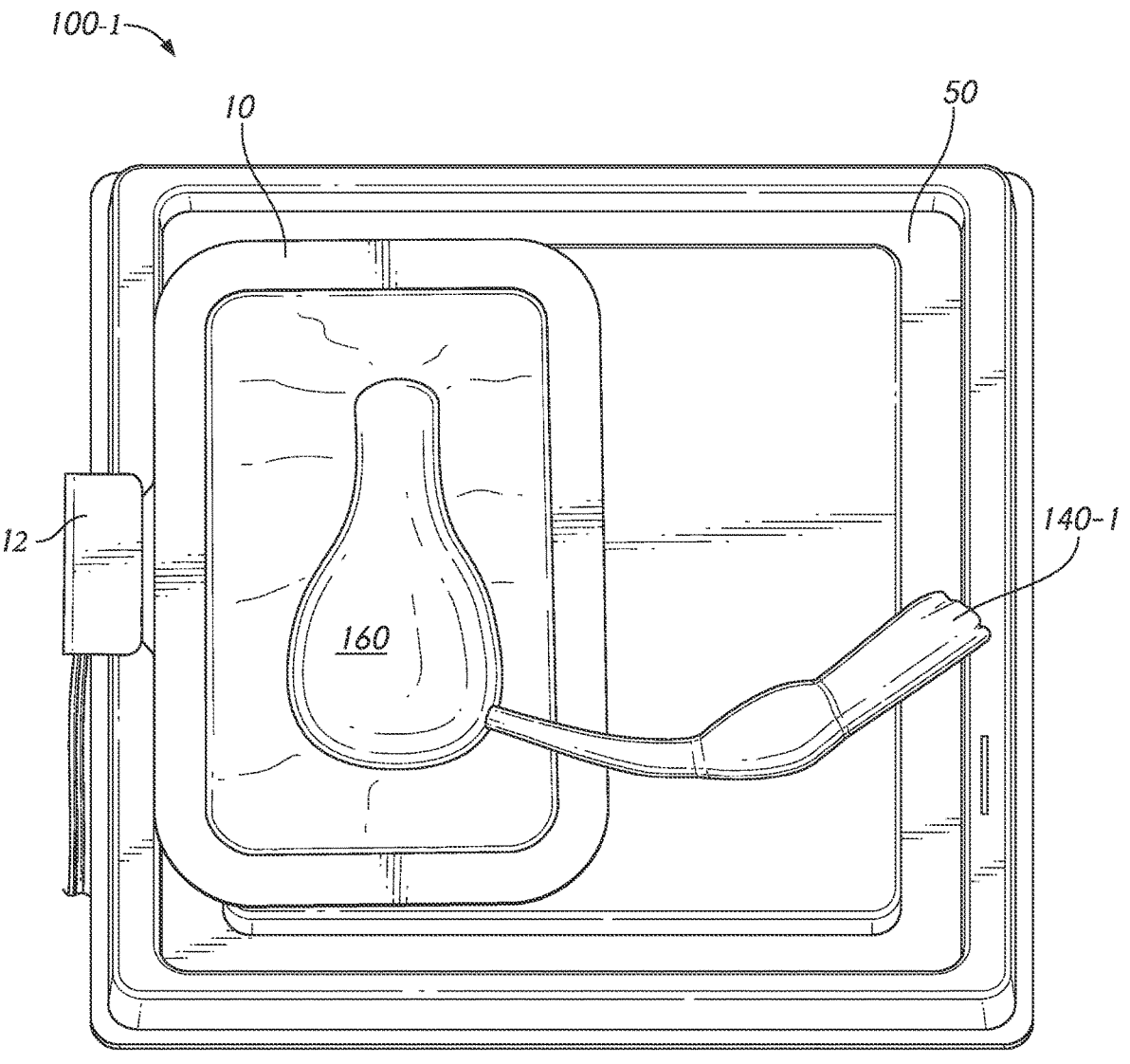
FIG. 3 illustrates an ectopic pregnancy model placed on a grounding pad inside a GYN pathology tray according to the embodiments of the present invention.

Referring next to FIG. 3, an ectopic pregnancy model 100 placed inside a GYN pathology tray 50 according to the embodiments of the present invention is shown. The GYN pathology tray 50 (the "tray 50") is configured to receive the ectopic pregnancy model 100 and is arranged to receive or include a grounding pad 10 that is removably connectable to an electrosurgical generator (not shown). The grounding pad 10 is configured to be in contact with the ectopic pregnancy model 100 or portions thereof and is positioned between the model 100 and the tray 50. As shown in FIG. 3, the simulated uterus 160 in accordance with various embodiments is placed and attached to the grounding pad 10 of the present invention thereby providing a connection to ground between the simulated fallopian tube 140 and the grounding pad 10. In some embodiments, the simulated uterus 160 may be attached to the grounding pad 10 using adhesive. A ground connection 12 is further provided on one side, e.g., the left side, of the grounding pad 10 and the tray 50 for connection of ground wires.

In various embodiments, the tray 50 may include a flat planar surface with a channel or cavity. The cavity may extend circumferentially around and near the edges of the tray. The cavity is configured to collect liquid or viscous material, such as material expelled from a simulated organ model. The tray 50 or portions thereof are configured to be impermeable. The tray 50 is configured to direct liquid towards the circumferential cavity. The tray 50 may include a center top portion raised or elevated higher than the tray's circumferential portion, the circumferential cavity or portions thereof. One or more tapered surfaces may extend from the raised center top portion towards the circumferential cavity. In one embodiment, the tray 50 may include an upper surface and a lower surface with both surfaces being planar and disposed parallel to each other. The lower surface, upper surface or both surfaces may include one or more projections or protrusions, e.g., a top and/or bottom surface supports, attached or integrated with a respective surface and may be disposed between the upper and lower surfaces to form the raised center top portion of the tray. The tray 50 may further include one or more slots that are positioned near the circumferential cavity and the outer edge or periphery of the tray. The one or more slots are configured to receive a model support configured to connect with portions of a simulated organ model.

In various embodiments, the model 100 comprises an elongate tube with a central lumen extending along a longitudinal axis between a proximal end and a distal end with the elongate tube being made of electrically conductive material and an encapsulated curved body attached to the elongate tube and extending in a direction transverse relative to the longitudinal axis with the encapsulated curved body being larger than the elongate tube. In various embodiments, only a portion of the encapsulated curved body is made electrically conductive material. In various embodiments, a conductive pad is removably attached to the encapsulated curved body. In various embodiments, a conductive pad is electrically/conductively attached to only the portion of the encapsulated curved body made of electrically conductive material. In various embodiments, the elongate tube is not in direct contact with the conductive pad. In various embodiments, a monopolar electrosurgical instrument is arranged to conduct RF energy between the elongate tube not in direct contact with the conductive pad and the encapsulated curved body in direct contact with the conductive pad. In various embodiments, the encapsulated curved body includes no access into an interior portion of the encapsulated curved body.

In various embodiments, a non-conductive material mass is disposed within the elongate tube. In various embodiments, the non-conductive material mass is non-uniform and semi-solid and disposed within a cavity within the central lumen of the elongate tube. In various embodiments, the non-conductive material mass has a viscosity greater than the elongate tube or the encapsulated curved body. In various embodiments, the non-conductive material mass is made of a liquid and fibrous mixture. In various embodiments, the non-conductive material mass comprises a fibrous material. In various embodiments, the non-conductive material mass is arranged to be removable from the elongate tube through a cut in the elongate tube. In various embodiments, the non-conductive material mass has a width greater than a diameter of a portion of the elongate tube connected to the encapsulated curved body. In various embodiments, the non-conductive material mass has a length less than a length of the elongate tube.

In the following, the steps involved in performing the surgical procedure for removing the ectopic pregnancy is explained in greater detail. The practitioner will practice a laparoscopic salpingostomy by placing the ectopic pregnancy model 100 inside a simulated laparoscopic environment such as a laparoscopic surgical training device or laparoscopic trainer. For this purpose, the model 100 is first connected to the grounding pad 10 of the GYN pathology tray 50 and then inserted into an internal cavity of the laparoscopic trainer. The tray 50 may also be secured to the base of the laparoscopic trainer using fastening means. In one embodiment, hook-and-loop type fastening means may be used under the tray 50, e.g., beneath the lower surface of the tray, to attach the model 100 to the internal cavity of the laparoscopic trainer. The practitioner will then grasp and manipulate the fallopian tube and orients it into optimal surgical position. Using a scalpel or other electrosurgical instrument a longitudinal incision is made into the wall of the fallopian tube. The practitioner will then grasp the simulated ectopic or embryo 120 and remove it from the fallopian tube 140. An inspection for removing any remaining remnants of the embryo will next be performed. The incision in the fallopian tube will then be closed by suturing or it will be left open on its place.

Figure 4:
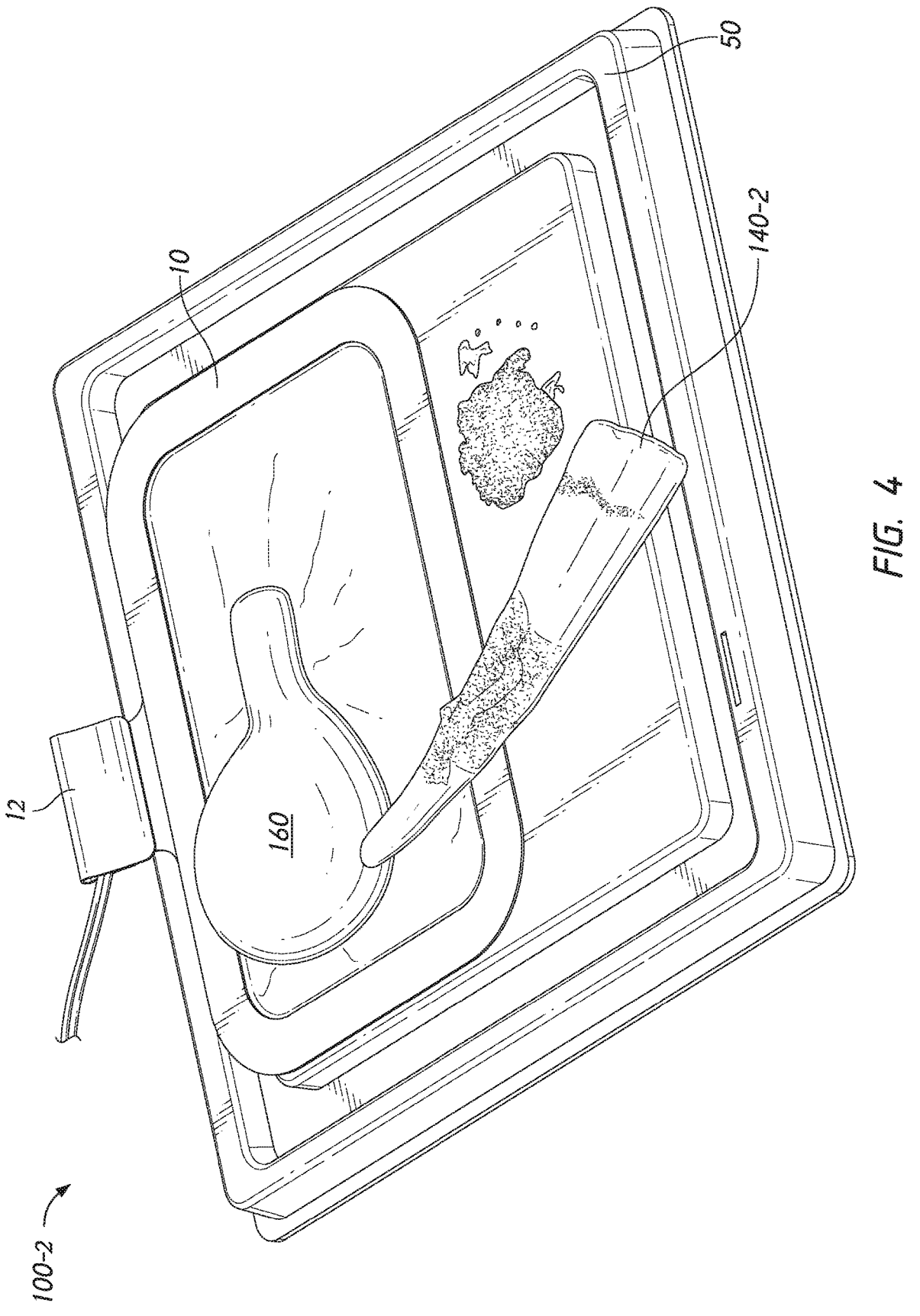
FIG. 4 shows an image of an ectopic mass after removal from the simulated fallopian tube.

With reference to FIG. 4, an image of an ectopic mass after removal from the simulated fallopian tube 140 according to the embodiments of the present invention is shown. To consider the surgical procedure successful, the embryo must be completely removed from the fallopian tube. The removal according to the embodiments of the present invention consists of one "main" mass and multiple smaller masses. In a laparoscopic salpingectomy, the ectopic pregnancy and the fallopian tube are both removed.

In another embodiment, the ectopic pregnancy model 100 is formed as part of another larger model or tissue structure. By way of example, the ectopic pregnancy model 100 according to the embodiments of the present invention may be part of an abdominal organ model or pelvic model that is sized and configured to be placed inside the laparoscopic surgical training device which will be described in greater detail further below.

According to another aspect of the present invention, an ovarian cyst torsion model for laparoscopic procedures is also provided. This model is an energy-compatible model that simulates an ovarian cyst capable of being partially or totally twisted around its ligament, e.g., ovarian torsion, to allow the surgical trainees and surgeons to practice the corresponding surgical procedures. In order to simulate the anatomy involved in this procedure, the simulated cyst is fluid-filled while the plane between the simulated fluid-filled cyst and the simulated ovarian tissue is dissectible when experiencing realistic surgical forces. To enhance the training experience, other accessory organs are also provided with this model. Examples of the other accessory organs may include the fallopian tube, mesosalpinx ligament-like tissues, and uterus. To further the training experience, a flexible adhesion technique is used for connecting organs involved in the torsion. The ovarian cyst torsion model, according to the embodiments of the present invention, allows surgical trainees and surgeons to train on intraoperative decision making, bimanual dexterity, tissue handling, use of electrosurgical instrumentation, and/or camera orientation.

Figure 5:
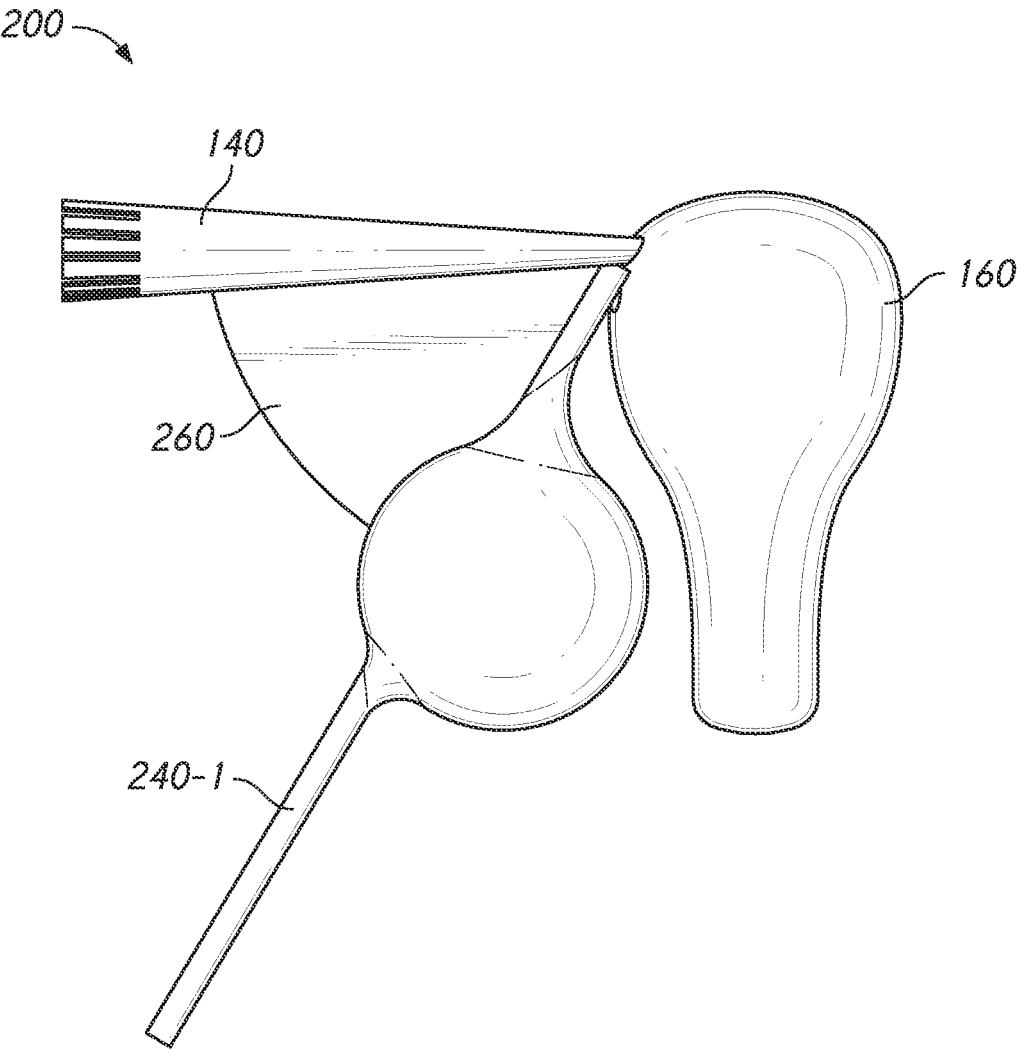
FIG. 5 illustrates a top view of an ovarian cyst torsion model according to the embodiments of the present invention.
Figure 6:
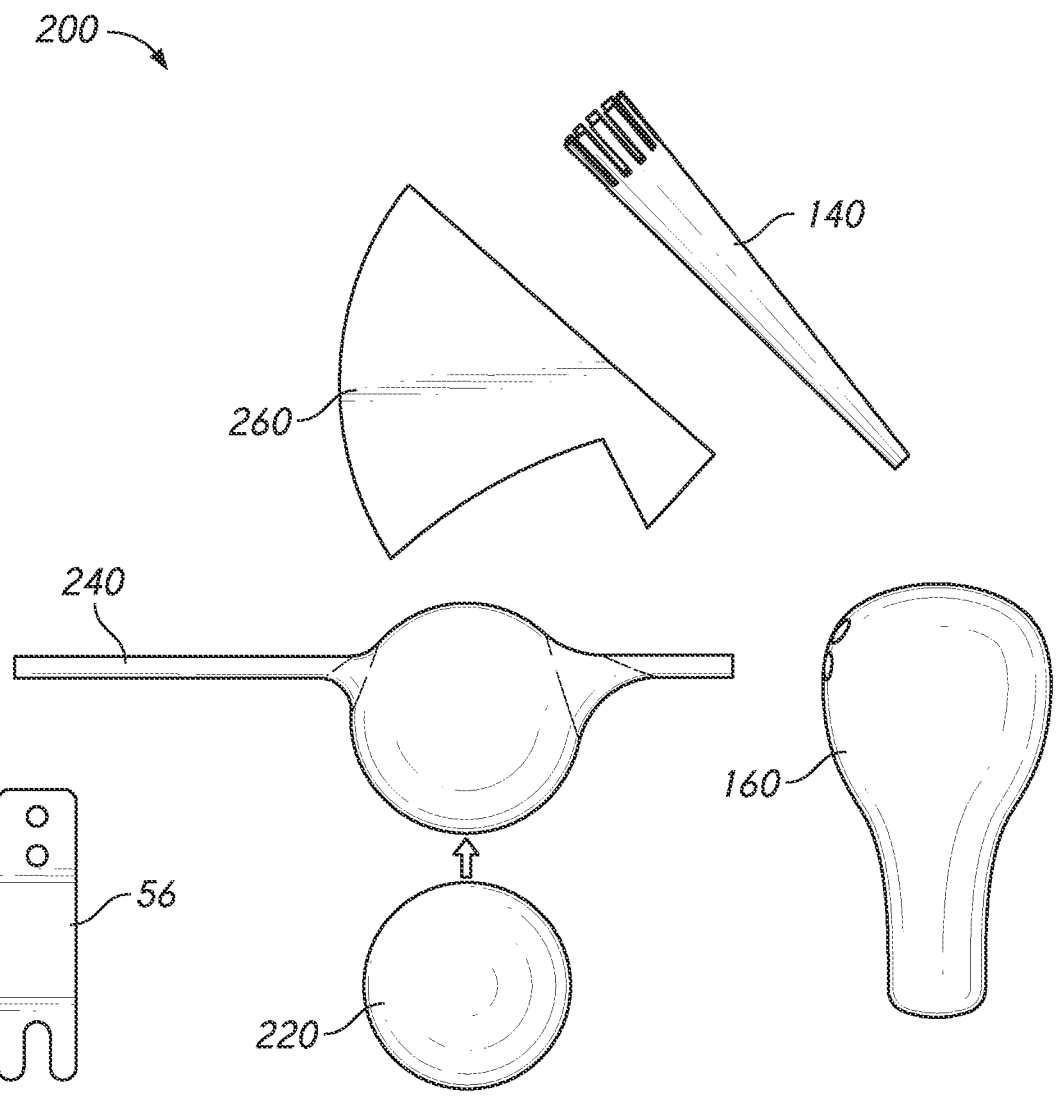
FIG. 6 illustrates an exploded, top view of an ovarian cyst torsion model according to the embodiments of the present invention.

FIGS. 5-6 illustrate an embodiment of an ovarian cyst torsion model 200. In that regard, FIG. 5 is a top view while FIG. 6 is an exploded, top view of the ovarian cyst torsion model 200. As shown in these figures, the ovarian cyst torsion model 200 may include a simulated ovarian-cyst capsule 240, 240-1 and a simulated mesosalpinx 260. The simulated ovarian-cyst capsule 240 may include a bulbous hollow structure having a proximal elongation at a proximal end and a distal elongation at a distal end. The proximal elongation has a tubular structure with a first lumen and the distal elongation has tubular structure with a second lumen.

Both of the first lumen and second lumen have a substantially constant diameter profile along their length. In some embodiments, the proximal elongation and distal elongation may have substantially the same diameter. In other embodiments, the proximal elongation and distal elongation may have different diameter. In various embodiments, the proximal elongation is shorter than the distal elongation. The proximal elongation and distal elongation in accordance with various embodiments are representing the ligaments that hold ovaries in place.

As shown in FIG. 6, the simulated ovarian-cyst capsule 240 may include a simulated cystic body or cyst 220 that is entirely enclosed within electrically conductive material of a simulated ovary. In various embodiments, the simulated cystic body or cyst 220 is formed using a mandrel having a spherical shape with a desired size, e.g., 3-5 cm. The simulated cystic body or cyst 220 according to the embodiments of the present invention may be filled with any type of liquid or fluid. In accordance with various embodiments, the simulated cystic body or cyst 220 of the present invention may be a pouch made of a platinum-cured silicone thermoset. In various embodiments, the platinum-cured silicone thermoset has a softness and/or resiliency similar to natural human tissue and/or has a shore hardness of equal to or lesser than 0010. One example of a suitable platinum-cured silicone thermoset is Smooth-On Dragon Skin® 0010 silicone. Other platinum-cured silicone thermoset may also be used to reach similar durometer and tear strength.

To emulate the fragility of the cystic wall with realistic durability, a diluted ratio of the platinum-cured silicone thermoset is used. In various embodiments, the simulated cystic body or cyst 220 is cast from a solution made of silicone and Novocs® silicone solvent with a diluted ratio of (e.g., 90 g:12 mL). This ratio of Dragon Skin® silicone to Novocs® silicone solvent, in accordance with various embodiments, is proven to be efficient in creating durable cystic wall that is realistically difficult to puncture. Different ratios of silicone to Novocs® with lower amount of each component (e.g., between about 3-12 g:1 mL-5 mL and/or with about a 2-3 to 1 ratio) may also be used to achieve different cystic wall fragility. In some embodiments, the simulated cystic body or cyst 220 may be made of any other suitable composition such as, for example, urethane rubber, rubber, and polyisoprene rubber (e.g., water balloon). In one embodiment, the simulated cystic body or cyst 220 may be made of KRATON polymer or an ultra-gel. In select embodiments, the simulated cystic body or cyst 220 may be made of any suitable cured electrically conductive material or tissue.

In accordance with various embodiments, the simulated cystic body or cyst 220 of the present invention may include a cyst opening defining a fluid outlet for fluid injection. A syringe filled with fluid may be used for filling the simulated cystic body or cyst 220 of the present invention to create a fluid-filled cystic body. In various embodiments, the simulated cystic body or cyst 220 is filled with water. In some embodiments, a self-closing silicone cap (not shown in the figures) is provided at the cyst opening allowing for a liquid, e.g., water, injection without leakage. In various embodiments, the cyst opening is sized and configured to accommodate and receive the self-closing silicone cap in a flush manner. Optionally, various colorants may also be added to the fluid to mimic realistic appearance. Other fillers may also be used to fill the simulated cystic body or cyst 220. Examples of such fillers may include polyethylene glycols (PEG), propylene glycol (PG), glycerin, a one part silicone, and food products.

One aspect of the present invention is to provide a dissection plane between the simulated cyst and the ovarian tissue so that it can be dissected by blunt dissection without rupturing the simulated cystic body or cyst 220. This is achieved by adding a layer of thickening material between the two materials of the simulated cyst and the simulated ovary. In various embodiments, the simulated cystic body or cyst 220, e.g., fluid-filled cystic body, may be coated with a thickening agent. By way of example and not limitation, the thickening agent that is used for this purpose may include cornstarch. According to the embodiments of the present invention, the thickening agent, e.g., cornstarch, at the interface between the simulated ovary and simulated cyst creates fragile adhesions in one or more regions for performing blunt dissection.

During the molding operation, the final step for creating the simulated ovarian-cyst capsule 240 is the encapsulation process. For this purpose, a two-part mold cavity is used. To accomplish complete encapsulation, the simulated fluid-filled cyst of the present invention is over-molded with electrically conductive material to create the simulated ovarian tissue. This is achieved using a two-step casting process. In the first step, a first ovary half is created allowing for cyst placement. In the second step, a second ovary half is created allowing for complete cyst encapsulation. Prior to the second step, additional material, e.g., electrically conductive material, may be optionally casted over the coated cyst in one or more locations to assist the surgical trainees and surgeons in locating the cyst.

In order to further enhance the training experience, adhesive may be selectively applied over the simulated cystic body or cyst 220 during the encapsulation process. It should be noted and understood, in various embodiments, that the base of the simulated cyst should demonstrate a stronger adhesion to the surrounding tissue relative to the remaining portion of the simulated cystic body. This is achieved using a high strength adhesive that is applied at the base of the simulated cyst to create a single site of strong adhesion that can be separated using sharp dissection. As such during the molding operation and prior to cyst placement, the high strength adhesive is applied to the fluid-filled and coated cyst at a predetermined location. The predetermined location is then placed in the vicinity of the proximal elongation of the mold. Care must be taken to ensure proper adhesion for creating the single site of strong adhesion. The molding process then goes to the final step for complete cyst encapsulation. According to the embodiments of the present invention, a suitable adhesive such as Loctite® 454 adhesive may be used for creating the single site of strong adhesion. Other such adhesives may also be used for this purpose. In an alternative embodiment, adhesive with low bond strength may be applied in at least one or more regions of the remaining portion of the simulated cystic body or cyst 220 to create multiple sites of fragile adhesions that can be separated using blunt dissection. One suitable example of adhesive for blunt dissection may include Elmer's Glue-All™ adhesive. This selective adhesion allows the surgical trainee and surgeons to use a combination of blunt and sharp dissection to separate the simulated cystic body or cyst 220 from the ovarian tissue as in a real-life surgical setting.

In various embodiments, the electrically conductive material of the simulated ovary may be made from double-network hydrogels (DN gels). The ionic composition of this type of hydrogels creates a realistic reaction to electrosurgical devices, allowing electrosurgical, e.g., monopolar and/or bipolar, instruments to be used with this model. Using a monopolar surgical instrument, an incision may be made into the ovarian-cyst capsule 240-1 to access the simulated cystic body or cyst 220 of the present invention for removal. In some embodiments, textile coated in conductive agents, e.g., hydrogel fibers, may be used for forming the ovarian tissue. By way of example, and not limitation, such compositions may include saline or vinegar solutions soaked into fibrous structure and Surgilube® lubricant applied to surface of fibrous structure.

As explained further above and in accordance with various embodiments, the ovarian cyst torsion model 200 is further provided with the simulated mesosalpinx 260. This organ model acts as an accessory organ allowing for torsion and detorsion of the simulated ovarian-cyst capsule 240. To achieve a realistic torsion, an extremely thin sheet is molded for this organ model. The sheet should be thin and pliable enough to permit torsion/detorsion of the simulated ovarian-cyst capsule 240. Accordingly, a 2-plate mold is used in accordance with the embodiments of the present invention for casting a thin enough sheet to simulate the mesosalpinx ligament-like tissues. In various embodiments, the simulated mesosalpinx 260 may have a thickness of approximately 1 mm or less. Once a thin sheet is manufactured, a custom pattern (shown in FIG. 6) may be developed for cutting the thin sheet into a desired size and shape. In some embodiments, hand-tracing and cutting processes may be used to create the desired size and shape. In various embodiments, die cutting process is used for cutting the thin-sheet into the desired pattern. This desired pattern assist in optimal positioning of the simulated ovarian-cyst capsule 240 during adhesion. In some embodiments, petroleum jelly, e.g., Vaseline® jelly, may be applied onto the simulated mesosalpinx 260 to avoid self-adhesion during torsion.

A further feature of the ovarian cyst torsion model 200 of the present invention is to assist the user in realistic tissue handling and evaluation of any accidental injury to the surrounding anatomy while using energy-based surgical instruments. As such, the simulated mesosalpinx 260 in accordance with the embodiments of the present invention is made of electrically conductive material or conductive tissue. In various embodiments, the electrically conductive material of the simulated mesosalpinx 260 may include a double or dual network hydrogels (DN gels). In select embodiments, the simulated mesosalpinx 260 may be made of silicone. In some embodiments, textile fabrics that are optionally coated with conductive solution may be cut into desired size and shape. In other embodiments, a mixture of KRATON polymer and oil may be used for creating the simulated mesosalpinx 260. In this embodiment, KRATON polymer solutions in tetrahydrofuran (THF) allows for solution casting that results in creation of very thin films. Multiple layers may be formed to achieve a desired thickness.

Still referring to FIGS. 5-6, the ovarian cyst torsion model 200 further includes a simulated fallopian tube 140. Similar to the simulated mesosalpinx 260, the simulated fallopian tube 140 acts as an accessory organ allowing for torsion and detorsion of the simulated ovarian-cyst capsule 240. Additionally, this organ model assists in simulating surgical cases where the fallopian tube is also involved in the torsion along with the ovary (shown in FIG. 7). In various embodiments, the simulated fallopian tube 140 is a hollow structure made of electrically conductive material or conductive tissue. In this embodiment, a thin-walled structure is formed by suspending a mandrel inside of a two-part mold cavity. The mandrel according to the embodiments of the present invention has the shape of actual fallopian tubes to create a realistic appearance and cavity size. In various embodiments, the electrically conductive material of the simulated fallopian tube 140 may include a double or dual network hydrogels. The ionic composition of this material assists in realistic tissue handing and evaluation of any accidental injury to the surrounding anatomy while using energy-based surgical instruments. In some embodiments, hydrogel fibers may be used for forming the simulated fallopian tube 140. Examples of these hydrogel fibers may include saline or vinegar solutions soaked into fibrous structure and Surgilube® lubricant applied to surface of fibrous structure. In select embodiments, the simulated fallopian tube 140 may be made of silicone. In other embodiments, textile fabrics coated with conductive solution may be used for forming the simulated fallopian tube 140.

Chitosan-based adhesives are used for connecting the simulated organs involved in the torsion. Many adhesives inhibit transfer of energy between the connected simulated organs. Using flexible electrically-conductive adhesives allow for creating a continuous conducting path with minimized interference resistance between the connected components. In various embodiments, 4% chitosan diluted in 2% acetic acid is used as the adhesive agent to adhere the simulated mesosalpinx 260 to the simulated ovarian-cyst capsule 240 and the simulated fallopian tube 140. In this embodiment, medium molecular weight chitosans are used to increase viscosity, thereby inhibiting or decreasing adhesive migration. In other embodiments, the adhesive agent may be prepared using a different ratio of chitosan to acetic acid. Additional crosslinking reagents may also be added to achieve higher viscosity. One suitable example of crosslinking reagents may include collagen. In some embodiments, ultraviolet-curing adhesives may be used as the adhesive agent. In alternative embodiments, hot melt adhesives (HMA) may be used as the adhesive agent. In one embodiment, natural adhesive such as tree sap may be used as the adhesive agent. In select embodiments, uncured hydrogels may be cast to create junctions for overmolding the simulated organs for adherence.

With further reference to FIGS. 5-6, the ovarian cyst torsion model 200 may further include a simulated uterus 160. The simulated uterus 160 according to the embodiments of the present invention acts as an attachment point for the simulated adnexa (fallopian tube 140/simulated mesosalpinx 260/ovarian-cyst capsule 240) while also providing an increased surface area for electrical grounding purposes. This configuration provides an anchoring point that allows the surgical trainees and surgeons the ability to interact with the simulated ovary and fallopian tube, while simultaneously training on bimanual dexterity and tissue handling. In various embodiments, the simulated uterus 160 may have a solid, monolithic, or hollow structure. In various embodiments, the simulated uterus 160 is a solid structure or portions thereof made of electrically conductive material or conductive tissue. The conductive material for forming the simulated uterus 160 may include an electro-conductive hydrogel formulation. In one embodiment, the simulated uterus 160 is made of metal puck. In another embodiment, the simulated uterus 160 is formed from natural or synthetic sponges that are saturated in electrolyte solution.

In various embodiments, the simulated uterus 160 is molded as a half uterus, e.g., having half of the uterus or various portions/amounts thereof arranged to be proximate to a grounding pad being made of electrically conductive material, to increase the surface area for electrical grounding purposes and to reduce the overall cost associated with manufacturing. Attaching the simulated adnexa (fallopian tube 140/simulated mesosalpinx 260/ovarian-cyst capsule

240) to the simulated uterus 160 by conventional techniques such as, for example, using an adhesive may result in inconsistent current flow. To ensure that a continuous electrical pathway is formed between the simulated organs, the simulated adnexa (fallopian tube 140/simulated mesosalpinx 260/ovarian-cyst capsule 240) according to the embodiments of the present invention is over-molded into the simulated uterus 160. In various embodiments, the step of adhering the simulated mesosalpinx 260 to the simulated ovarian-cyst capsule 240 and simulated fallopian tube 140 may be performed prior or after this over-molding step.

Figure 7:
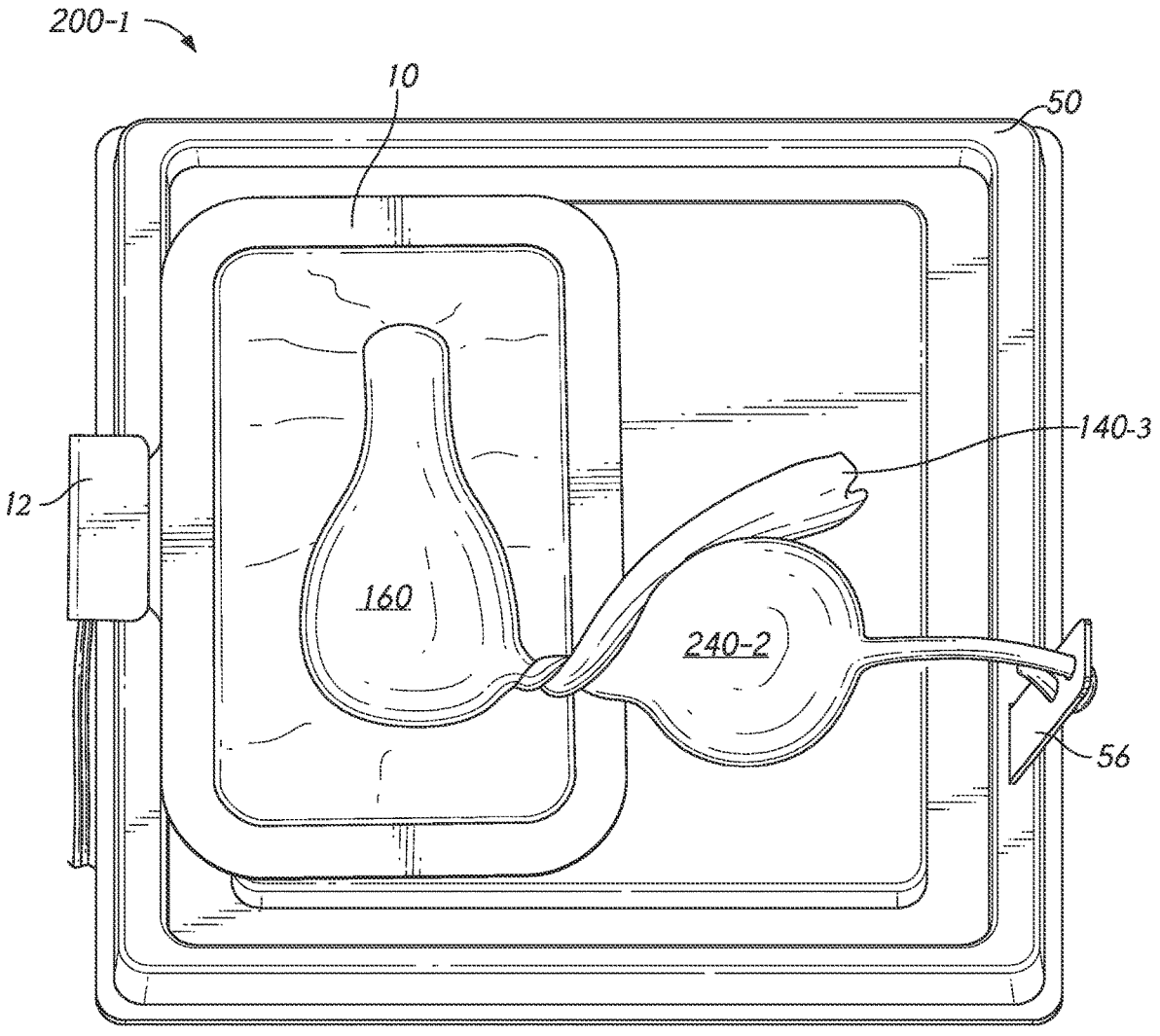
FIG. 7 illustrates an ovarian cyst torsion model placed on a grounding pad inside a GYN pathology tray according to the embodiments of the present invention.

Referring next to FIG. 7, an ovarian cyst torsion model 200 placed inside a GYN pathology tray 50 according to the embodiments of the present invention is shown. The GYN pathology tray 50 (the "tray 50") is configured to receive the ovarian cyst torsion model 200 and is arranged to receive or include the grounding pad 10 that is removably connectable to an electrosurgical generator (not shown). The grounding pad 10 is configured to be in contact with the ovarian cyst torsion model 200 or portions thereof and is positioned between the model 200 and the tray 50. As shown in FIG. 7, the simulated uterus 160 in accordance with various embodiments is placed and attached to the grounding pad 10 of the present invention thereby providing a connection to ground between the simulated adnexa (fallopian tube 140/simulated mesosalpinx 260/ovarian-cyst capsule 240) and the grounding pad 10. In some embodiments, the simulated uterus 160 may be attached to the grounding pad 10 using adhesive. A ground connection 12 is further provided on one side, e.g., the left side, of the grounding pad and the tray for connection of ground wires.

As described further above and in accordance with various embodiments, the tray 50 may include a flat planar surface with a channel or cavity. The cavity may extend circumferentially around and near the edges of the tray. The cavity is configured to collect liquid or viscous material, such as material expelled from the ovarian cyst torsion model 200. The tray 50 or portions thereof are configured to be impermeable. The tray 50 is configured to direct liquid towards the circumferential cavity. The tray 50 further includes a center top portion raised or elevated higher than the tray's circumferential portion, the circumferential cavity or portions thereof. The tray 50 may further includes one or more slots that are positioned near the circumferential cavity and the outer edge or periphery of the tray. The one or more slots are configured to receive a model support or sidewall 56 configured to connect with portions of a simulated organ model. An exemplary embodiment of the model support or sidewall 56 is shown in FIGS. 6-7. The model support or sidewall 56 may be formed from heat formable thermoplastic sheets such as KYDEX. According to the embodiments of the present invention, KYDEX® Thermoplastic Sheet is die cut with holes to accommodate portions of a simulated organ model. In various embodiments, the ovarian ligament, e.g., one or more portions of the ovarian cyst-capsule, transversely extends from the simulated uterus 160 and has portions being elevated relative to a bottom surface of the simulated uterus and/or the tray 50. In the embodiment shown in FIG. 7, the model support or sidewall 56 is disposed inside one slot provided on the right side of the outer edge or periphery of the tray 50 for connection to the simulated ovarian-cyst capsule 240-2 of model 200. In this embodiment, the model support or sidewall 56 helps to position the ovarian cyst torsion model 200 within the tray 50 while also presenting the ovarian ligament, e.g., one or more portions of the ovarian-cyst capsule, in an anatomically correct orientation. As it can be seen from FIG. 7, in various embodiments, the ovarian ligament-like tissue of model 200 is pulled through the holes in the model support or sidewall 56 and glued in place to ensure optimal positioning of the model 200 during the surgical procedure.

In the following, the steps involved in performing the surgical procedure for detorsion and removal of ovarian cyst is explained in greater detail. The practitioner will practice a laparoscopic cystectomy by placing the ovarian cyst torsion model 200 inside a simulated laparoscopic environment such as a laparoscopic surgical training device or laparoscopic trainer. For this purpose, the model 200 is first connected to the grounding pad 10 of the GYN pathology tray 50 and then inserted into an internal cavity of the laparoscopic trainer. The tray 50 may also be secured to the base of the laparoscopic trainer using fastening means, e.g., hook-and-loop type fastening means. The practitioner will then determine the orientation of the torsioned anatomy and untwist the cystic ovary from the surrounding structures. The cystic ovary is then placed into the optimal surgical position for removal of the cyst and an incision is next made into the wall of the ovarian-cyst capsule 240 using a scalpel or other electrosurgical instrument. The practitioner will then identify the plane for dissection between the cyst and the ovarian tissue and separate the cyst from the tissue using a combination of blunt and sharp dissection. The incision in the ovarian tissue will then be closed by suturing or it will be left open on its place.

In another embodiment, the ovarian cyst torsion model 200 is formed as part of another larger model or tissue structure. By way of example, the ovarian cyst torsion model 200 according to the embodiments of the present invention may be part of an abdominal organ model or pelvic model that is sized and configured to be placed inside the laparoscopic surgical training device which will now be described in greater detail below.

Figure 8:
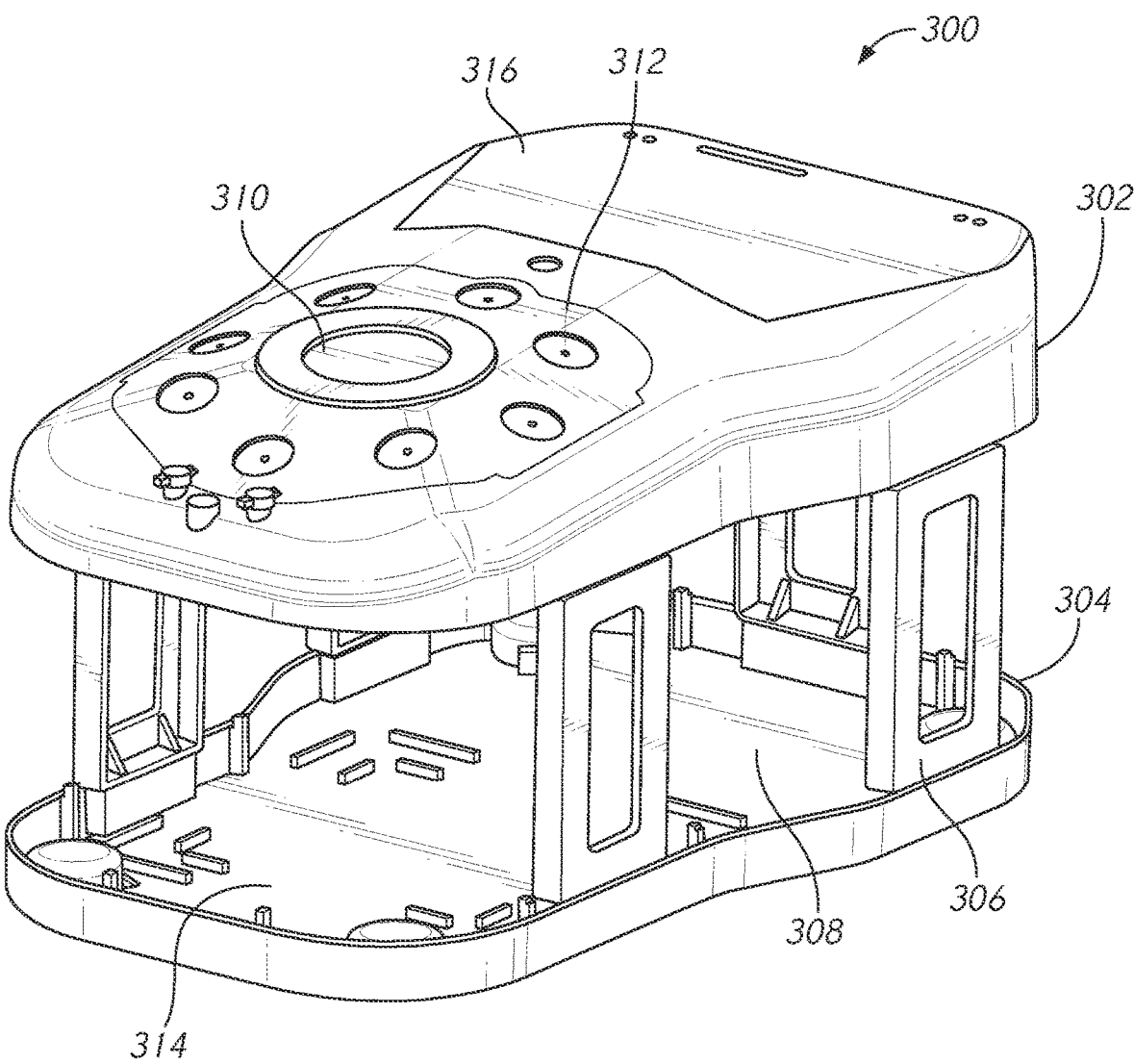
FIG. 8 illustrates a top perspective view of a laparoscopic trainer for use with an ectopic pregnancy model according to the embodiments of the present invention.

With reference to FIG. 8, a laparoscopic surgical training device 300 according to the embodiments of the present invention is shown. The laparoscopic surgical training device 300 provides an internal cavity 308 substantially obscured from the user for receiving simulated or live tissue or model organs or training models of the like described in this invention. The body cavity 308 is accessed via a tissue simulation region 310 that is penetrated by the user employing devices to practice surgical techniques on the tissue or practice model found located in the body cavity 308. Although the internal cavity 308 is shown to be accessible through a tissue simulation region 310, a hand-assisted access device, trocar, or single-site port device may be alternatively employed to access the internal cavity 308. An exemplary laparoscopic surgical training device is described in U.S. Pat. No. 8,764,452 entitled "Portable Laparoscopic Trainer" filed on Sep. 29, 2011 and incorporated herein by reference in its entirety. The laparoscopic surgical training device 300 is particularly well suited for practicing laparoscopic or other minimally invasive surgical procedures.

The laparoscopic surgical training device 300 includes a top cover 302 connected to and spaced apart from a base 304 by a plurality of legs 306. The laparoscopic surgical training device 300 is configured to mimic the torso of a patient such as the abdominal region. The top cover 302 is representative of the anterior surface of the patient and the space between the top cover 302 and the base 304 is representative of an interior of the patient or body cavity where organs reside. The laparoscopic surgical training device 300 is a useful tool for teaching, practicing and demonstrating various surgical procedures and their related instruments in simulation of a patient undergoing a surgical procedure. Surgical instruments are inserted into the cavity through the tissue simulation region 310 as well as through pre-established apertures 312 in the top cover 302. Various tools and techniques may be used to penetrate the top cover 302 to perform mock procedures on simulated organs or practice models placed between the top cover 302 and the base 304. The base 304 includes a model-receiving area 314 or tray (not shown) for staging or holding a simulated tissue model or live tissue. The model-receiving area 314 of the base includes frame-like elements for holding the model in place. To help retain a simulated tissue model or live organs on the base 304, a clip attached to a retractable wire is provided at various locations around the base 304. The retractable wire is extended and then clipped to hold the tissue or organ model in position substantially beneath the tissue simulation region 310. Other means for retaining the tissue model include a patch of hook-and-loop type fastening material affixed to the base 204 in the model receiving area 314 such that it is removably connectable to a complementary piece of hook-and-loop type fastening material affixed to the tissue or organ model.

A video display monitor 316 is hinged to the top cover 302 (shown in a closed orientation in FIG. 8). The video display monitor 316 is connectable to a variety of visual systems for delivering an image to the monitor. For example, a laparoscope inserted through one of the pre-established apertures 312 or a webcam located in the internal cavity 308 and used to observe the simulated procedure can be connected to the video display monitor 316 and/or a mobile computing device to provide an image to the user. Also, audio recording or delivery means may also be provided and integrated with the laparoscopic surgical training device 300 to provide audio and visual capabilities. Means for connecting a portable memory storage device such as a flash drive, smart phone, digital audio or video player, or other digital mobile device is also provided, to record training procedures and/or play back pre-recorded videos on the monitor for demonstration purposes. Of course, connection means for providing an audio visual output to a screen larger than the monitor is provided. In another variation, the top cover 302 does not include a video display monitor but includes means for connecting with a laptop computer, a mobile digital device or tablet and connecting it by wire or wirelessly to the trainer.

When assembled, the top cover 302 is positioned directly above the base 304 with the plurality of legs 306 located substantially around the periphery and interconnected between the top cover 302 and base 304. The top cover 302 and base 304 are substantially the same shape and size and have substantially the same peripheral outline. The internal cavity 308 is partially or entirely obscured from view. The plurality of legs 306 include openings to allow ambient light to illuminate the internal cavity as much as possible and also to provide as much weight reduction as possible for convenient portability. The top cover 302 is removable from the plurality of legs 306 which in turn are removable or collapsible via hinges or the like with respect to the base 304. Therefore, the unassembled laparoscopic surgical training device 300 has a reduced height that makes for easier portability. In essence, the laparoscopic surgical training device 300 provides a simulated body cavity or internal cavity 308 that is obscured from the user. The internal cavity 308 is configured to receive at least one surgical model accessible via at least one tissue simulation region 310 and/or pre-formed apertures 312 in the top cover 302 through which the user may access the models to practice laparoscopic or endoscopic minimally invasive surgical techniques.

Any portion of the organ or training models can be made of one or more organic base polymer including but not limited to hydrogel, single-polymer hydrogel, multi-polymer hydrogel, rubber, latex, nitrile, protein, gelatin, collagen, soy, non-organic base polymer such as thermo plastic elastomer, KRATON polymer, silicone, foam, silicone-based foam, urethane-based foam and ethylene vinyl acetate foam and the like. Into any base polymer one or more filler may be employed such as a fabric, woven or non-woven fiber, polyester, nylon, cotton and silk, conductive filler material such as graphite, platinum, silver, gold, copper, miscellaneous additives, gels, oil, cornstarch, glass, dolomite, carbonate mineral, alcohol, deadener, silicone oil, pigment, foam, poloxamer, collagen, gelatin and the like. The adhesives employed may include but are not limited to cyanoacrylate, silicone, epoxy, spray adhesive, rubber adhesive and the like.

The above description is provided to enable any person skilled in the art to make and use the devices or systems and perform the methods described herein and sets forth the best modes contemplated by the inventors of carrying out their inventions. Various modifications, however, will remain apparent to those skilled in the art. It is contemplated that these modifications are within the scope of the present disclosure. Different embodiments or aspects of such embodiments may be shown in various figures and described throughout the specification. However, it should be noted that although shown or described separately each embodiment and aspects thereof may be combined with one or more of the other embodiments and aspects thereof unless expressly stated otherwise. It is merely for easing readability of the specification that each combination is not expressly set forth.

While the principles of the disclosure have been described above in connection with specific models and apparatuses, it is to be clearly understood that this description is made only by way of example and not as limitation on the scope of the invention.

What is claimed is:

1. A gynecology pathology surgical simulation system comprising:
   a fluid-filled cystic body encapsulated within a bulbous hollow structure having a proximal elongation at a proximal end and a distal elongation at a distal end,
   wherein the fluid-filled cystic body is selectively adhered to the bulbous hollow structure in at least one or more regions of an interface between the fluid-filled cystic body and the bulbous hollow structure, thereby creating a plane for a combination of blunt and sharp dissection, and
   wherein the fluid-filled cystic body is coated with a thickening agent in the at least one or more regions of the interface between the fluid-filled cystic body and the bulbous hollow structure to create multiple sites of fragile adhesions.

2. The surgical simulation system of claim 1 wherein the bulbous hollow structure is made of electrically conductive material.

3. The surgical simulation system of claim 1 wherein the at least one or more regions of the interface between the fluid-filled cystic body and the bulbous hollow structure are adhered using a low bond strength adhesive to create multiple sites of fragile adhesions.

4. The surgical simulation system of claim 1 wherein the proximal elongation of the bulbous hollow structure has a first length and the distal elongation of bulbous hollow structure has a second length; the second length being greater than the first length.

5. The surgical simulation system of claim 1 wherein the fluid-filled cystic body is adhered at one location to the bulbous hollow structure using a high strength adhesive to create a single site of strong adhesion.

6. The surgical simulation system of claim 1 wherein the one location defines a base of the fluid-filled cystic body and is placed proximate to the proximal elongation.

7. The surgical simulation system of claim 1 wherein the fluid-filled cystic body is made from a diluted ratio of platinum-cured silicone thermoset.

8. The surgical simulation system of claim 1 wherein the fluid-filled cystic body is made from a solution made of silicone and Novocs® silicone solvent.

9. The surgical simulation system of claim 1 wherein the fluid-filled cystic body is filled with water.

10. The surgical simulation system of claim 1 wherein the fluid-filled cystic body is filled with liquid or fluid mixed with colorants to achieve realistic appearance.

11. A gynecology pathology surgical simulation system comprising:
   a fluid-filled cystic body encapsulated within a bulbous hollow structure having a proximal elongation at a proximal end and a distal elongation at a distal end,
   wherein the fluid-filled cystic body is selectively adhered to the bulbous hollow structure in at least one or more regions of an interface between the fluid-filled cystic body and the bulbous hollow structure, thereby creating a plane for a combination of blunt and sharp dissection, and
   wherein the fluid-filled cystic body is coated with a thickening agent in the at least one or more regions of the interface between the fluid-filled cystic body and the bulbous hollow structure to create multiple sites of fragile adhesions; the thickening agent comprising cornstarch.

12. The surgical simulation system of claim 11 wherein the bulbous hollow structure is made of electrically conductive material.

13. The surgical simulation system of claim 11 wherein the at least one or more regions of the interface between the fluid-filled cystic body and the bulbous hollow structure are adhered using a low bond strength adhesive to create multiple sites of fragile adhesions.

14. The surgical simulation system of claim 11 wherein the proximal elongation of the bulbous hollow structure has a first length and the distal elongation of bulbous hollow structure has a second length; the second length being greater than the first length.

15. The surgical simulation system of claim 11 wherein the fluid-filled cystic body is adhered at one location to the bulbous hollow structure using a high strength adhesive to create a single site of strong adhesion.

16. The surgical simulation system of claim 15 wherein the one location defines a base of the fluid-filled cystic body and is placed proximate to the proximal elongation.

17. The surgical simulation system of claim 11 wherein the fluid-filled cystic body is made from a diluted ratio of platinum-cured silicone thermoset.

18. The surgical simulation system of claim 11 wherein the fluid-filled cystic body is made from a solution made of silicone and Novocs® silicone solvent.

19. The surgical simulation system of claim 11 wherein the fluid-filled cystic body is filled with water.

20. The surgical simulation system of claim 11 wherein the fluid-filled cystic body is filled with liquid or fluid mixed with colorants to achieve realistic appearance.

* * * * *